(12) United States Patent
Gronauer et al.

(10) Patent No.: US 7,584,076 B2
(45) Date of Patent: Sep. 1, 2009

(54) METHOD FOR COMMUNICATION OF MULTIPLE SENSOR NODES IN A SENSOR NETWORK

(75) Inventors: Manfred Gronauer, Essen (DE); Bert Bley, Essen (DE)

(73) Assignee: ista International GmbH (DE)

( * ) Notice: Subject to any disclaimer, the term of this patent is extended or adjusted under 35 U.S.C. 154(b) by 123 days.

(21) Appl. No.: 11/553,156

(22) Filed: Oct. 26, 2006

(65) Prior Publication Data

US 2007/0094385 A1 Apr. 26, 2007

(30) Foreign Application Priority Data

Oct. 26, 2005 (DE) .................. 10 2005 051 563

(51) Int. Cl.
*G06F 11/00* (2006.01)
*G06F 17/40* (2006.01)

(52) U.S. Cl. .............. 702/188; 702/122; 702/123; 702/187; 709/206; 340/10.2

(58) Field of Classification Search ......... 702/116–123, 702/127, 188, 189, 173–187; 709/206, 224, 709/226; 455/502
See application file for complete search history.

(56) References Cited

U.S. PATENT DOCUMENTS 4,509,170 A * 4/1985 Hollinger et al. ............ 370/458

| | | | |
|---|---|---|---|
| 2003/0078062 A1* | 4/2003 | Burr | 455/502 |
| 2003/0104848 A1 | 6/2003 | Brideglall | |
| 2005/0083178 A1 | 4/2005 | Friedrich | |
| 2005/0231327 A1* | 10/2005 | Friedrich et al. | 340/10.2 |

FOREIGN PATENT DOCUMENTS

| DE | 10349647 | 6/2005 |
|---|---|---|
| DE | 102004018540 | 11/2005 |

* cited by examiner

*Primary Examiner*—Eliseo Ramos Feliciano
*Assistant Examiner*—Phuong Huynh
(74) *Attorney, Agent, or Firm*—Walter G. Hanchuk; Chadbourne & Parke LLP

(57) ABSTRACT

The present invention relates to a method for communication of multiple sensor nodes in a sensor network having a receiving node, particularly a sensor node of the sensor network, a receiving node prompting other sensor nodes to transmit sensor data to the receiving node by transmitting at least one synchronization telegram, for which the receiving node switches to receive for a time period, in particular for a CAP phase, in order to receive telegrams from at least one other sensor node, the time period being subdivided into multiple time intervals, the probability that a sensor node transmits a telegram in a specific time interval being a function of at least one predefinable parameter.

21 Claims, 2 Drawing Sheets

METHOD FOR COMMUNICATION OF MULTIPLE SENSOR NODES IN A SENSOR NETWORK

RELATED APPLICATIONS

This disclosure claims priority to German Patent Application No. 102005051563.0 filed on Oct. 26, 2005, which is hereby incorporated by reference.

FIELD OF THE INVENTION

The present invention relates to a method for the communication of multiple sensor nodes in a sensor network with a receiving node, in particular a sensor node of the sensor network, a receiving node prompting that other sensor nodes transmit sensor data to the receiving node by transmitting at least one synchronization telegram, after which the receiving node switches to receive, particularly after transmitting at least one synchronization telegram, for a time period, in particular for a CAP phase (contention access period), in order to receive telegrams from at least one other sensor node. A telegram in the scope of the following further description of the present invention is understood as a closed package having data of any type, which is communicated between two nodes of the network. Correspondingly, the data may be status data, synchronization data, consumption data, or other data.

Sensor networks of this type are used, for example, in the field of consumption data detection, e.g., in the detection of consumption data about power consumption, gas consumption, heating consumption, water consumption, or other resources for which a receiver is charged by a provider.

BACKGROUND OF THE INVENTION

In order to avoid readout personnel having to come into the various individual residences in order to read out consumption meters separately on location, linking the devices for consumption data detection into a network, in which these devices may communicate with one another, is practiced in the prior art. Since devices for consumption data detection of this type are typically devices having sensors, these are also referred to as sensor nodes in the framework of the network group.

Typically, in sensor networks of this type, the consumption data detected by the sensor nodes situated in the network is conducted using a relay via the individual sensor nodes to a central detection point, where the individual consumption data is collected and may then be provided for accounting. For example, readout personnel may retrieve the data at the central detection point; it is also possible if necessary to relay the centrally summarized data via long-distance data transmission.

Relaying the individual data via the different sensor nodes is known in a sensor network of this type having multiple sensor nodes, which means that a sensor node may operate both as a transmitting sensor node and also as a receiving sensor node.

In the example of the above-mentioned prior art, a sensor node may thus also represent a central collection point or may form an arbitrary sensor node of the sensor network, via which the data is relayed.

Furthermore, it is known in sensor networks of this type that multiple sensor nodes may wish to connect to a receiving node in order to relay accumulated data about consumption values or possibly also other data, such as status messages or error messages. For this purpose, a path optimization may be selected in regard to the transport path of the data by the individual sensor nodes on the basis of predefined criteria, it being possible that multiple sensor nodes wish to communicate with a specific other receiving node, since the path via this special receiving node is classified as optimal or at least preferred in relation to other paths.

Accordingly, collisions of telegrams may occur, for example, data transmissions or other transmissions which the sensor nodes wish to exchange with a receiving node, since possibly multiple sensor nodes switch to transmit simultaneously and correspondingly reception is not possible for a receiving node, since the individual telegrams or data transmissions may not be discriminated between, because they collide in time.

Moreover, sensor nodes must synchronize with another sensor node for the data exchange in order to be able to perform a data exchange following this synchronization in the scope of a predetermined exchange protocol.

SUMMARY OF THE INVENTION

For energetic reasons, a receiving node first transmits at least one so-called synchronization telegram, which signals to other sensor nodes which receive a synchronization telegram of this type that the receiving node is available for receiving. In order to be able to receive a synchronization telegram of this type, the requirement exists that the sensor nodes are ready to receive at the instant of the transmission of this synchronization telegram, for which a sensor node typically activates its internal receiving unit over the duration of a receiving window. Accordingly, in order to achieve a time overlap between transmission of the synchronization telegram and an open receiving window, the individual sensor or receiving nodes may be provided with corresponding internal clock systems After transmitting a synchronization telegram, the transmitting receiving node typically switches to receive for a time period which may particularly be predetermined, in order to then be able to receive telegrams within this time period which are transmitted from surrounding sensor nodes, which wish, for example, to relay data or other information to the receiving node. The transmitting sensor nodes may enter into competition with one another to transmit telegrams to the receiving node.

In this case, as noted above, collisions of transmitted telegrams may occur if multiple sensor nodes transmit their telegrams simultaneously. Correspondingly, after transmission of a sensor telegram, the transmitting receiving node may not be capable of discriminating at least one telegram in order to perform a communication with the transmitting sensor node. This causes a significant energy loss.

The object of the present invention is to provide a method, using which the possibility is provided of ensuring the most secure and reliable communication possible between individual sensor nodes and a receiving node, even if multiple sensor nodes transmit their telegrams within the time period in which the receiving node switches to receive.

This object is achieved in that the time period within which a receiving node may receive telegrams from multiple sensor nodes is subdivided into multiple time intervals, the probability that a sensor node transmits a telegram in a specific time interval being a function of at least one predefined or predefinable parameter.

BRIEF DESCRIPTION OF THE DRAWINGS

Exemplary embodiments of the present invention are illustrated in the following figures.

DETAILED DESCRIPTION

Figure 1:
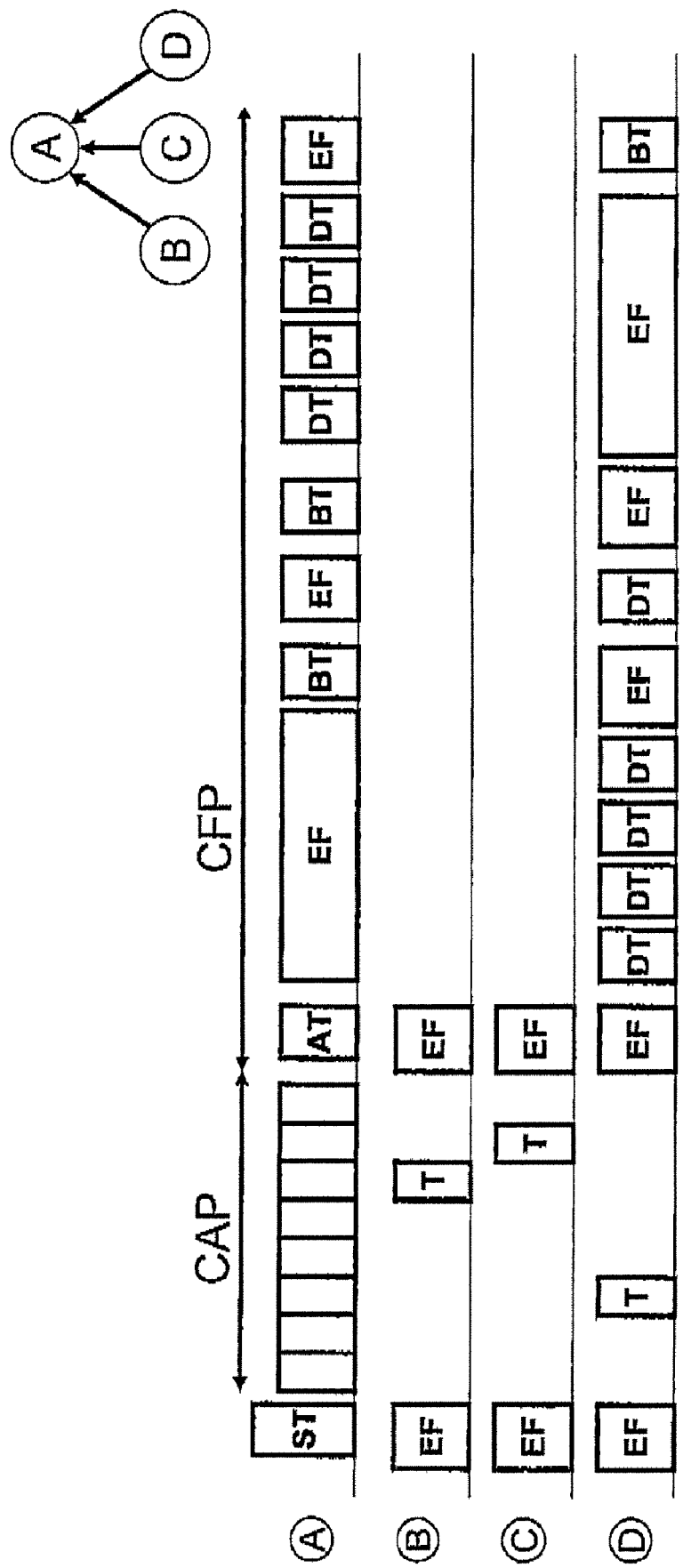
FIG. 1 shows the chronological sequence of the communication between a total of four sensor nodes, one of which forms a receiving node.

The method according to the present invention is accordingly that for the individual sensor nodes which transmit information, e.g., consumption data in the scope of a telegram, and wish to relay it to the receiving node, establishing when they transmit within the time period available, i.e., in which of the multiple time intervals they transmit a telegram, is a function of a probability which is predefinable by an arbitrary system parameter and particularly deviates from an uniform distribution of the probability for all participating sensor nodes.

For this reason, because of a probability deviating from uniform distribution for all sensor nodes, which may be defined by arbitrary parameters or may be predefined, there are random accumulations of transmitted telegrams, so that collisions may occur in specific time intervals of the predefined time period, but at least one of the sensor nodes will transmit its telegram to be transmitted in a time interval in which none of the remaining prompted sensor nodes also transmits a telegram with higher probability in the overall observation in comparison to uniform distribution, so that through a probability as a function of at least one external parameter, it is possible to contribute to providing collision-free time intervals, in which at least one of the sensor nodes which receives a synchronization telegram from a receiving node may successfully transmit its telegram to be transmitted to a receiving node.

For this purpose, in one embodiment of the present invention, at least one sensor node may immediately also transmit sensor data, for example, consumption data or possibly also other data, such as status messages, error messages, or similar items in a telegram which it transmits in one of the time intervals available according to the predefined or predefinable probability. At the end of the time period provided for reception at the receiving node, at least one successful data exchange has thus occurred.

According to another embodiment of the method according to the present invention, a telegram, which a sensor node transmits after receiving at least one synchronization telegram, may represent an application telegram. Accordingly, a telegram of this type still contains no data, i.e., particularly no consumption data, but rather solely a communication, according to which a sensor node communicates to a receiving node that it wishes to transmit data, particularly consumption data.

In equivalence to the above-mentioned method, according to which data may be transmitted immediately from at least one of the sensor nodes, in this implementation of the method, at least one of the prompted sensor nodes will successfully apply for the data transmission following later. An application telegram of this type may accordingly also be referred to as an RTS telegram (request-to-send telegram).

Accordingly, if a collision-free transmission of an application telegram from at least one sensor node has succeeded in at least one of the multiple time intervals, according to the method according to the present invention, the receiving node may also transmit a prompt telegram upon this collision-free reception from at least one of the sensor nodes, or if collision-free application telegrams were transmitted from multiple sensor nodes, to multiple sensor nodes, in particular a CTS telegram (clear-to-send), in order to thus prompt at least one of the addressed sensor nodes to transmit its data to the receiving node.

For this purpose, a prompt telegram may possibly contain information about the instant at which the data transmission is to occur. This may be particularly advantageous if multiple sensor nodes have applied collision-free within the time period provided for reception, so that subsequently multiple sensor nodes are also prompted to transmit their data to the receiving node, preferably in chronological sequence. In order to coordinate this chronological sequence of the data transmission, a prompt telegram may accordingly contain information about the instant at which the data transmission is to occur. In particular, if only one sensor node is prompted to transmit its data, the data transmission typically occurs directly after the receipt of the prompt telegram at the sensor node, so that the data communication then begins between these two nodes.

In another embodiment of the method according to the present invention, the parameter of which the probability is a function may be formed by a classification number which is assigned to each time interval, so that the probability that a sensor node transmits a telegram in a specific time interval of the available time period is a function of the classification number of this time interval. Individual time intervals may be numbered continuously in the chronological sequence with rising or falling classification numbers or may be numbered arbitrarily. For this purpose, none of the time intervals provided overall may have a classification number which corresponds to the classification number of another time interval. Thus, it may be provided that an equal probability that a sensor node will transmit its telegram precisely in these time intervals does not result for any two-time intervals from the total number of time intervals into which the time period is subdivided.

For this purpose, the calculation guideline from which the probability results as a function of the classification number may be arbitrary in principle. For example, if the classification number is identified by the character S, the probability in one embodiment may be selected as $½^S$. Of course, arbitrary other calculation guidelines for the probability are possible. For example, in one embodiment, the probability may fall with increasing classification number; the possibility also exists that the probability rises with increasing classification number. Thus, in particular with reference to the above-mentioned example, the probability may halve in each case beginning from a starting probability, particularly with rising or falling classification number. In the above-mentioned example, the starting probability was selected beginning at a classification number of 1 at ($½$), the probability then being halved in each case, i.e., in the time interval having the classification number 2, the probability that a sensor node transmits its telegram in this time interval is then only ($¼$).

In addition to this above-mentioned exemplary assignment of a possible probability to the different time intervals, which particularly deviates from a uniform distribution, the probability may also be a function of at least one of the following parameters: the sensor number of a sensor node, the age of the data to be transmitted, the quantity of the data to be transmitted, the priority which is assigned to a status message, particularly an error message, the number of nodes lying in the reception range, particularly at which data exists, a preset of a receiving node, which is particularly communicated by transmitting a synchronization telegram. Arbitrary further current parameters are conceivable here, which are predefinable in the scope of the method.

If the probability is made a function of the serial number of a sensor node, which is not identical for any two different sensor nodes, in this way a preference of specific sensor nodes within the network is achieved in principle in the scope of the method.

In contrast, if the age of the data to be transmitted is used as the parameter for determining a probability, in a preferred embodiment, precisely those sensor nodes at which consumption data has already been accumulated for an especially long time for transmission or particularly further transport into a receiving node may transmit their data preferentially, since these sensor nodes transmit their telegrams in the time interval which accordingly have a high probability. For this purpose, for example, the sensor nodes having data already provided for a long time may transmit their telegram at the beginning of the available receiving time period of the receiving node, thus, for example, in the first or the first available time interval of this time period.

In another embodiment, the probability may be made a function of the quantity of the data to be transmitted, which means that in equivalence to the age of the data, those sensor nodes at which a high data quantity is accumulated may preferentially transmit their data. The probability distribution may also be selected inversely, so that the sensor nodes at which only little data is accumulated for transmission may preferentially transmit their data.

In another embodiment, the probability may be made a function of priorities, such as a status message, to which an error message may be assigned. If an error message of this type has a high priority, for example, an error message of this type may be transmitted in a time interval, which defines a high transmission probability for a status message of this type.

Furthermore, the probability may be a function of the number of nodes lying in the receiving range. For example, if very many nodes, which wish to exchange the data with a receiving node, are to be considered, in principle, a different probability distribution may be selected for the available time intervals in comparison to when only a small number of nodes are addressed by the synchronization telegram of the receiving node.

Finally, a receiving node may give a preset, for example, by transmitting its synchronization telegram, of the probability with which all or only specific addressed sensor nodes distribute their telegrams over the particular available time intervals. In particular, information may also be contained in a synchronization telegram here, about which of the receiving sensor nodes are to transmit its telegram in which specific time interval. Accordingly, the probability that a specific addressed sensor node transmits its telegram in a specific time interval may possibly also be equal to 1. For this purpose, a probability of 1 thus results for each sensor node, but in a different time interval in each case.

In order to further avoid collisions in the available time period which is subdivided into time intervals according to the present invention, in a refinement according to the present invention, telegrams, whether they are immediately direct data telegrams or also initially only application telegrams, may only be transmitted from those sensor nodes at which sensor data to be transmitted is also accumulated. Accordingly, sensor nodes, which do lie in principle in the receiving range of a synchronization telegram, are not in competition with other sensor nodes if no data, which is to be transmitted, exists in these sensor nodes. Accordingly, the transmission or traffic occurrence of telegrams between individual nodes may be reduced in this way.

In another refinement, a sensor node, which has successfully performed a data exchange with a receiving node, may not transmit further telegrams to receiving nodes, in particular until new data to be transmitted accumulates at the sensor node. This essentially means that after the successful data exchange, a sensor node of this type, even if it receives the synchronization telegrams of a receiving node again thereafter, does not transmit a telegram again in order to communicate with the receiving node. The load of telegrams used in the sensor network may thus also be reduced overall in this way.

In another embodiment, only those sensor nodes, which the receiving node, which transmits a synchronization telegram, have stored as a possible receiver for sensor data in an internal table, may transmit telegrams. Thus, a collision rate may accordingly also be reduced by the presence of such a table, since in principle a sensor node may receive a synchronization telegram, but in the internal table, this transmitting node is not stored as a possible receiver of data, so that for this reason the sensor node does not transmit a telegram. Through the definition of an internal table of this type provided in the sensor node, definitions may accordingly also be provided, according to which the individual sensor nodes may connect to one another, so that the possible paths of a data flow in the sensor network may also be defined in this way.

In another refinement of the method, after the transmission of at least one synchronization telegram, which is particularly provided especially for this purpose, all sensor nodes may transmit a telegram, independently of whether data to be transmitted exists at them. A telegram of this type, which neither comprises consumption data nor is to be understood as an application telegram in this embodiment, may be provided, for example, to check the receiving situation for future transmissions or to ascertain the number of sensor nodes located in the receiving range. The further proceedings for exchanging data may thus be determined on the basis of this information, which a receiving node thus accumulates; for example, it may thus be established how the probability is distributed over the individual time intervals, particularly if a high or a low number of communication-ready sensor nodes is ascertained or expected.

The possibility also exists that only a specific fraction of sensor nodes are prompted to transmit telegrams with the transmission of at least one synchronization telegram. For this purpose, the prompted sensor nodes may be encrypted in a synchronization telegram.

In another embodiment, the number of time intervals may be a function of the number, particularly the expected number, of sensor nodes which wish to transmit data. For example, if only a small number of sensor nodes exists or is expected, the number of time intervals, particularly also the time period per se, may be reduced, since with a lower number of sensor nodes a lower collision probability is also to be expected. In contrast, if the particular expected number of sensor nodes is high, the number of time intervals may also be selected higher or the length of the available time period may also be extended.

Accordingly, the possibility exists in principle of lengthening the time period and leaving time intervals identical in regard to their width for this purpose, through which the number of time intervals is increased, or the possibility also exists of changing the width of the time intervals while keeping the time period constant, in order to enlarge or reduce the number of these time intervals. For this purpose, the selection of the number of time intervals may be established by a receiving node when transmitting a synchronization telegram, for example, and transmitted to the receiving sensor node if necessary, the expected number of sensor nodes particularly being able to be relevant for this purpose. The expected number of sensor nodes may result, for example, from information, which exists at the receiving node from an earlier data, exchange or an earlier transmission of one or more synchronization telegrams, possibly provided especially for this purpose.

As already noted, the receiving node may be formed, for example, by an arbitrary sensor node of the sensor network. The possibility also exists that a separate mobile receiving device forms a receiving node. As noted above, a distinct central receiving station may also form a receiving node as defined in the present invention.

In another embodiment, the receiving node may also, directly after or with the transmission of a synchronization telegram, transmit to the sensor nodes the number of the sensor nodes which may answer to a received synchronization telegram with the transmission of a telegram. The probability at which the affected sensor node may transmit a telegram in a specific time interval may thus be ascertained from the transmitted number of the sensor nodes itself. This probability may be set to $W=(1/N)\times(1-1/N)^{N-1}$ for an access to a specific predefined time interval, for example. For this purpose, N is a parameter transmitted by the receiving node which—particularly as well as possible—is to correspond to the number of the sensor nodes. It may be ensured in this way that, independently of the node number, a constant proportion of sensor nodes are always successful with a telegram, such as an application telegram. This aspect according to the method is particularly suitable if the number of available time intervals is constant, but the number of the sensor nodes may be arbitrary and it is nonetheless necessary that after every synchronization telegram, the collision-free transmission of a telegram, such as an application telegram of at least one sensor node, is successful.

It was already noted above that the number of the sensor nodes may be estimated, for example, from information of preceding telegram communications or competitions between individual sensor nodes. According to a predefinable method, this estimated value, which is transmitted to the sensor nodes according to the above-mentioned method aspect, may be increased, for example, if none of the sensor nodes was able to transmit its telegram to a receiving node without collision after the transmission of a preceding synchronization telegram. Thus, in the event of lasting collisions, i.e., if no successful telegram transmission was possible after transmission of a synchronization telegram, the number of estimated sensor nodes is increased each time and, vice versa, if successful transmission of a telegram was possible, the number of the sensor nodes is reduced.

In relation to the above-mentioned classification numbers S, the probability may also be selected as $(1/K)^S$, deviating from $(1/2)^S$, K being able to be a predefinable value; for example, the value K may be predefined by the number of the sensor nodes or at least as a function of the number of the sensor nodes. In particular, the value K may be a natural number greater than or equal to 2.

FIG. 1 illustrates an example of the case, according to which three sensor nodes B, C, and D wish to transmit their consumption data to a receiving node A. This receiving node A may be situated in a hierarchical sensor network, for example, in a level above the sensor nodes B, C, and D, as shown in the graphic image. According to the method according to the present invention, the receiving node A transmits a synchronization telegram ST at a predefined instant. A synchronization telegram ST of this type may only be received if, at the same instant, ideally shortly beforehand, the sensor nodes B, C, and D open a respective receiving window EF, within which reception of this one synchronization telegram is possible.

The time period of the reception of the sensor node or node A now operating as a receiving node may be predefined in the network or this time period may be transmitted to the sensor nodes B, C, and D within the synchronization telegram ST, for example, so that in any case the individual sensor nodes B, C, and D know the maximum time period which is available for receiving telegrams at the receiving node A.

Furthermore, the sensor nodes B, C, and D know which division of the time period into sequential time intervals is predefined, this time period forming a CAP phase (contention access period) in the present case. In the present case, the time period CAP is divided into eight equally long time intervals.

According to the present invention, a different probability applies for each of these time intervals, according to which a sensor node B, C, and D places its telegram T in a particular time interval, using which a sensor node B, C, and D compete in this embodiment to exchange its consumption data with the receiving node A. Such a telegram may also be referred to, for example, as an RTS telegram (request-to-send).

In the present case, the three application telegrams T, each of which the sensor nodes B, C, and D transmit, are all collision-free and do not cover any identical time intervals. Because of this collision-free reception, the receiving node A may thus receive each of these application telegrams and communicate with each of the individual sensor nodes B, C, and D in principle in order to exchange consumption data, according to the preferred method, the receiving node A selecting the sensor node whose application telegram was received collision-free as the first.

Thus, the receiving node A selects the sensor node D here in that the receiving node A transmits a prompt telegram AT, which may be received in principle in corresponding chronologically placed receiving windows EF of all sensor nodes B, C, D provided for this purpose, information being contained in the prompt telegram that only the sensor node D is prompted to transmit its data, which this node then performs in the four sequential data telegrams DT, which are received in the synchronized receiving window EF of the receiving node A. Such a prompt telegram AT may also be referred to as a CTS telegram (clear-to-send). Using a confirmation telegram BT, which is received in the receiving window EF of the sensor node D, the receiving node A confirms the correct receipt of the data and may then possibly receive further data DT in the renewed receiving window EF.

The possibility also exists in the following course of time that the receiving node A also transmits data telegrams DT to the sensor node D. This is not absolutely necessary, but forms a further measure of the method, however. The further data exchange may be performed in principle in the same way as from node D to node A, however, the sensor node D now transmitting a conformation telegram DT at the end of the receiving phase EF, which is received in the receiving window EF of the receiving node A provided for this purpose. Therefore, after competition at multiple sensor nodes B, C, and D, a successful data exchange with the sensor node D has occurred. If necessary, the exchange with the other nodes B and C may also be initiated automatically after this data exchange, for example, by transmitting a new prompt telegram on the part of the sensor node A.

The competition phase, as show in FIG. 1, may also start from the beginning, i.e., the node A may transmit a reduced synchronization telegram ST or also several thereof to produce better overlap probability with receiving windows EF at the sensor nodes, the sensor node D preferably no longer transmitting an application telegram to this synchronization telegram, however, since no data to be transmitted currently exists in this sensor node.

Figure 2:
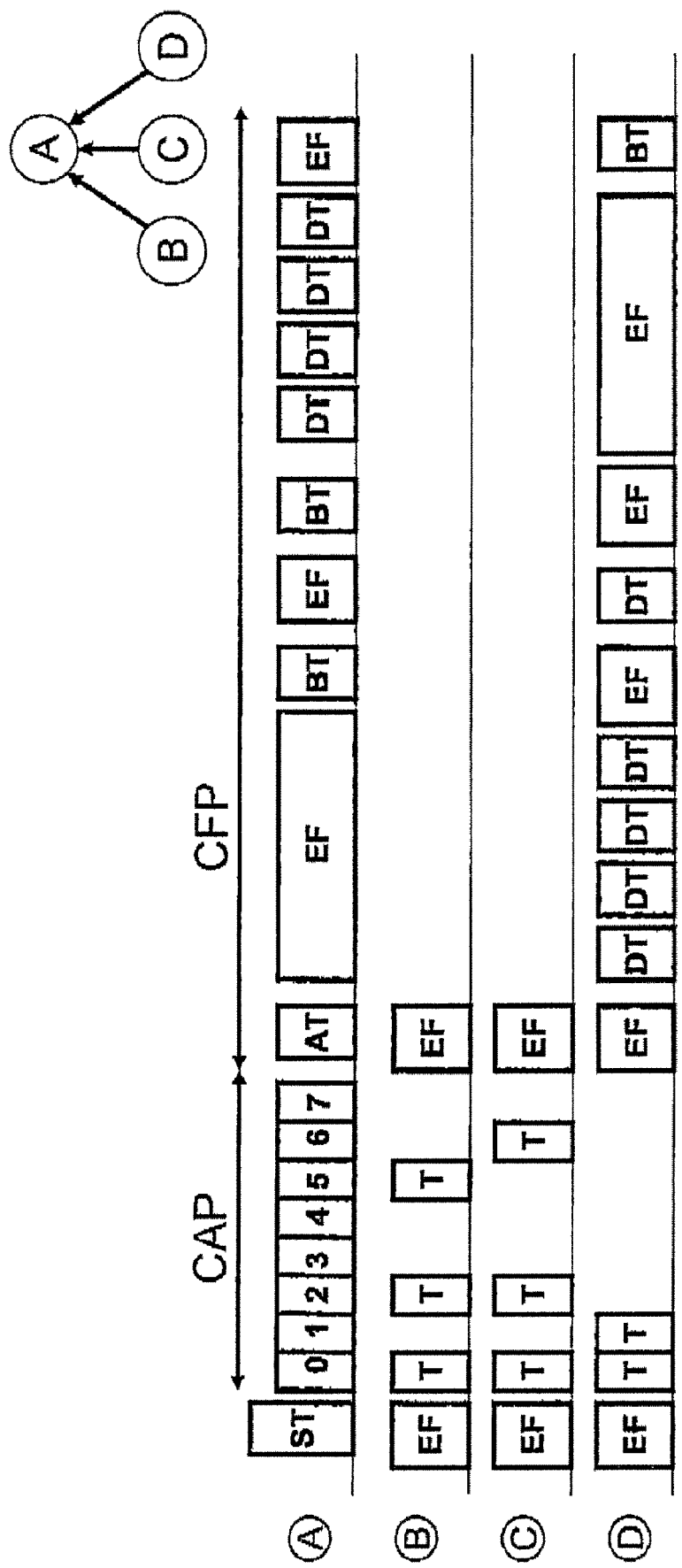
FIG. 2 shows a sequence according to FIG. 1, in which a sensor node transmits more than one telegram within the receiving time period.

FIG. 2 essentially shows, in relation to FIG. 1, the refinement that within the time period CAP, which is subdivided into eight individual time intervals S0 through S7 here, a sensor node not only transmits an application telegram T, but possibly multiple telegrams, the transmission of these application telegrams T being able to be determined according to a predefined probability on the basis of the classification number S0 through S7.

Is recognizable here that three telegrams T of the sensor nodes B, C, and D collide in time interval S=0, so that reception is not possible. The first telegram received collision-free is the telegram T of the sensor node D in time interval S=1. Accordingly, in equivalence to the method described in FIG. 1, the receiving node A now requests only that the sensor node D transmit its data by transmitting a prompt telegram AT, as described in FIG. 1.

Notwithstanding the exemplary embodiment cited here, numbering using classification numbers S may also began at a number other than 0, e.g., at 1, or any arbitrary other number. It is also possible that this numbering is arbitrary.

What is claimed is:

1. A method for communication of multiple sensor nodes in a sensor network comprising:
a receiving node prompting other sensor nodes to transmit sensor data to the receiving node by transmitting at least one synchronization telegram, for which the receiving node switches to receive for a time period, in order to receive telegrams from at least one sensor node of the other sensor nodes, where the time period is subdivided into multiple time intervals, and a probability that a given sensor node transmits a telegram in a specific time interval being a function of at least one predefinable parameter and being different from an uniform distribution of the probability for all participating sensor nodes, thus providing random accumulations of transmitted telegrams so that collisions occur in specific time intervals of the time period and at least one sensor node of all participating sensor nodes will transmit its telegram with a higher probability than at least another sensor node of all participating sensor nodes in a given time interval.

2. The method according to claim 1 wherein the telegrams are application telegrams.

3. The method according to claim 2 further comprising the receiving node, upon collision-free reception of the application telegram, prompting at least one sensor node to transmit its data to the receiving node by transmitting a prompt telegram.

4. The method according to claim 1 further comprising the other sensor nodes transmitting sensor data directly in a telegram.

5. The method according to claim 1 wherein the at least one predefinable parameter is formed by a classification number which is assigned to each time interval, so that the probability that a sensor node transmits a telegram in a specific time interval is a function of the classification number of the time interval.

6. The method according to claim 5 wherein the probability changes with increasing classification number.

7. The method according to claim 1 wherein the probability is a function of at least one of the following parameters:
   a. the serial number of a sensor node
   b. the age of the data to be transmitted
   c. the quantity of the data to be transmitted
   d. the priority, which is assigned to a status message
   e. the number of nodes lying in the reception range
   f. a preset of the receiving node communicated by transmitting a synchronization telegram.

8. The method according to claim 1 wherein telegrams are only transmitted by those sensor nodes at which sensor data to be transmitted is accumulated.

9. The method according to claim 1 wherein a sensor node which has performed a data exchange with the receiving node does not transmit any farther telegrams to the receiving node until new data to be transmitted accumulates at the sensor node.

10. The method according to claim 1 wherein only those sensor nodes, which the receiving node transmitting a synchronization telegram has stored as possible receivers for sensor data in an internal table, transmit telegrams.

11. The method according to claim 1 further comprising, after transmitting at least one synchronization telegram, all sensor nodes, independently of whether data to be transmitted exists at them, transmit an additional telegram.

12. The method according to claim 1 further comprising, upon transmission of at least one synchronization telegram, a predetermined part of sensor nodes is prompted to transmit telegrams, for which the prompted sensor nodes are encrypted in a synchronization telegram.

13. The method according to claim 1 wherein the number of the time intervals is a function of the expected number of sensor nodes which wish to transmit data.

14. The method according to claim 1 wherein a receiving node is formed by a sensor node of the sensor network or by a separate mobile receiving device.

15. The method according to claim 1 wherein the time period is a contention access period phase.

16. The method according to claim 1 wherein the telegrams are request-to-send telegrams.

17. The method according to claim 3 wherein the prompt telegram is a clear-to-send telegram.

18. The method according to claim 6 wherein the probability halves in each case beginning at an initial probability with changing classification number.

19. The method according to claim 1 wherein a sensor node which has performed a data exchange with the receiving node does not transmit any further telegrams to the receiving node until new data to be transmitted accumulates at the sensor node.

20. The method according to claim 11 wherein the telegram transmitted by all sensor nodes after transmitting at least one synchronization telegram is to check the receiving situation for future transmissions.

21. The method according to claim 11 wherein the telegram transmitted by all sensor nodes after transmitting at least one synchronization telegram is to ascertain the number of sensor nodes located in receiving range.

* * * * *